United States Patent
Beisele

(10) Patent No.: US 6,638,567 B1
(45) Date of Patent: Oct. 28, 2003

(54) HARDENABLE COMPOSITION WITH A PARTICULAR COMBINATION OF CHARACTERISTICS

(75) Inventor: Christian Beisele, Auggen (DE)

(73) Assignee: Vantico, Inc., Brewster, NY (US)

( * ) Notice: Subject to any disclaimer, the term of this patent is extended or adjusted under 35 U.S.C. 154(b) by 0 days.

(21) Appl. No.: 09/936,706

(22) PCT Filed: Mar. 6, 2000

(86) PCT No.: PCT/EP00/01954
§ 371 (c)(1),
(2), (4) Date: Sep. 14, 2001

(87) PCT Pub. No.: WO00/55254
PCT Pub. Date: Sep. 21, 2000

(30) Foreign Application Priority Data

Mar. 16, 1999 (CH) ................................................ 485/99

(51) Int. Cl.⁷ ................................................ B05D 5/12
(52) U.S. Cl. ........................ 427/116; 523/457; 523/466; 528/409; 528/418
(58) Field of Search ................................ 523/457, 466; 528/409, 418; 427/116

(56) References Cited

U.S. PATENT DOCUMENTS

| 3,202,947 A | 8/1965 | Budovec |
| 4,009,141 A | 2/1977 | Nichols et al. |
| 4,419,496 A | 12/1983 | Henton et al. |

FOREIGN PATENT DOCUMENTS

| CA | 2164915 | * | 6/1996 |
| DE | 3239872 A1 | | 10/1982 |
| EP | 0 045 357 A1 | | 2/1982 |
| EP | 0 578 613 A2 | | 6/1993 |
| EP | 0 717 073 A2 | | 6/1996 |
| EP | 00 780 436 A1 | | 6/1997 |
| FR | 2 630 578 | | 4/1988 |
| GB | 2217719 | * | 1/1989 |

OTHER PUBLICATIONS

Abstract of JP9097729, Apr. 8, 1997.
Abstract of JP54094559, 7/79.

* cited by examiner

Primary Examiner—Robert Dawson
Assistant Examiner—D. Aylward
(74) Attorney, Agent, or Firm—Proskauer Rose LLP

(57) ABSTRACT

A curable epoxy resin composition comprising
(a) a cycloaliphatic epoxy resin that is liquid at RT and, suspended therein, a core/shell polymer,
(b) a polycarboxylic anhydride and
(c) fillers, wherein the composition is flame-retardant because two different fillers (c1) and (c2) are present, the nature of filler (c1) being such that, starting at RT, it is able to release water as the temperature rises, the total proportion of fillers (c1) and (c2) is from 58 to 73% by weight, based on the total amount of components (a), (b), (c1) and (c2), and the ratio by weight of the fillers (c1):(c2) is from 1:3 to 1:1, is suitable as a casting resin, especially in the impregnation of electrical coils and in the production of electrical components, such as air-cooled transformers, bushings, insulators, switches, sensors, converters and cable end seals.

17 Claims, No Drawings

HARDENABLE COMPOSITION WITH A PARTICULAR COMBINATION OF CHARACTERISTICS

The present invention relates to curable compositions, to their use, for example as casting resins in the production of air-cooled transformers and other electrical components, and to the crosslinked products obtainable by curing the compositions, which products are distinguished by the fact that they exhibit simultaneously the features of good flame retardance, high mechanical strength and low dielectric losses at high operating temperatures.

Air-cooled transformers (voltage range up to about 40 kV) are provided with a winding, the sheathing of which consists of an electrically insulating synthetic resin. In addition to providing insulation, the synthetic resin sheathing should also contribute to the mechanical strength of the windings and also have flame-retardant properties.

The critical factors for a sheathing resin for high performance transformers are the oxygen index for combustibility, the temperature at which the dielectric loss factor tan 6 is 25% at 50 Hz and the crack index value achieved, which is a measure of resistance to temperature variation.

Flame-retardant casting resins for potting air-cooled transformers are well known and are generally based on bisphenol A epoxy resins, reinforcing fillers and flame-retardants. For example, U.S. Pat. No. 3,202,947 describes flame-retardant compositions for air-cooled transformers, containing liquid bisphenol A diglycidyl ethers, hexahydrophthalic acid, hydrated alumina and tris(chloroalkyl) phosphates.

Cycloaliphatic resin systems are also known. U.S. Pat. No. 4,009,141 describes electrically insulating curable compositions consisting of selected cycloaliphatic epoxy resins and dicarboxylic anhydrides, which are reinforced with large amounts of zirconium silicate fillers and contain finely divided hydrated alumina as additional second filler. They are suitable for the encapsulating insulation of electrical components, such as, for example, of metal transformer components, or transformer bushings.

Curable, flame-retardant compositions for air-cooled transformers are also described in FR 2 630 578 B1. Those compositions contain at least 20% by weight pretreated aluminium hydroxide, based on the total composition consisting of resin, hardener and reinforcing additives. "Pretreated" in this context means that, by means of heat treatment, water is removed from the aluminium hydroxide in an amount of about from 0.5 to 10% by weight, based on the original weight before removal of the water.

Since in such systems the dielectric loss factor tan δ increases considerably at higher temperature, those systems are not suitable for transformers having high operating temperatures.

There is therefore a need for casting resin formulations that exhibit simultaneously the features of flame retardance, low dielectric losses and good mechanical properties, especially good cracking behaviour.

That problem has now been solved by the use of cycloaliphatic systems comprising core/shell polymers, as described in EP 0 578 613 A2. It has been found that the addition of certain fillers in certain ratios and certain amounts yields potting compounds that are distinguished both by low brittleness and by a low tan δ value and also by good flame retardance.

The present invention accordingly relates to curable compositions comprising
   (a) a cycloaliphatic epoxy resin that is liquid at RT and, suspended therein, a core/shell polymer,
   (b) a polycarboxylic anhydride and
   (c) fillers,
wherein the composition is flame-retardant because two different fillers (c1) and (c2) are present, the nature of filler (C1) being such that, starting at RT, it is able to release water as the temperature rises, the total proportion of fillers (C1) and (c2) is from 58 to 73% by weight, based on the total amount of components (a), (b), (C1) and (c2), and the ratio by weight of the fillers (C1):(c2) is from 1:3 to 1:1.

The compositions according to the invention are resin systems of moderate to relatively high viscosity that can be fully cured by heat. In the cured state they are thermosetting materials of relatively high rigidity having a glass transition temperature of about from 80 to 140° C. The term "cycloaliphatic epoxy resin" in the context of this invention denotes any epoxy resin having cycloaliphatic structural units, that is to say it includes both cycloaliphatic glycidyl compounds and β-methylglycidyl compounds-as well as epoxy resins based on cycloalkylene oxides. "Liquid at room temperature (RT)" is to be understood as meaning pourable compounds that are liquid at 25° C., i.e. are of low to medium viscosity (viscosity less than about 20 000 mPa·s).

Suitable cycloaliphatic glycidyl compounds and β-methylglycidyl compounds are the glycidyl esters and β-methylglycidyl esters of cycloaliphatic polycarboxylic acids, such as tetrahydrophthalic acid, 4-methyltetrahydrophthalic acid, hexahydrophthalic acid, 3-methylhexahydrophthalic acid and 4-methylhexahydrophthalic acid.

Further suitable cycloaliphatic epoxy resins are the diglycidyl ethers and β-methylglycidyl ethers of cycloaliphatic alcohols, such as 1,2-dihydroxycyclohexane, 1,3-dihydroxycyclohexane and 1,4-dihydroxycyclohexane, 1,4-cyclohexanedimethanol, 1,1-bis(hydroxymethyl)cyclohex-3-ene, bis(4-hydroxycyclohexyl)methane, 2,2-bis(4-hydroxycyclohexyl)propane and bis(4-hydroxycyclohexyl) sulfone.

Examples of epoxy resins having cycloalkylene oxide structures are bis(2,3-epoxycyclopentyl) ether, 2,3-epoxycyclopentylglycidyl ether, 1,2-bis(2,3-epoxycyclopentyl)ethane, vinyl cyclohexene dioxide, 3,4-epoxycyclohexylmethyl 3',4'-epoxycyclohexanecarboxylate, 3,4-epoxy-6-methylcyclohexylmethyl 3',4'-epoxy-6'-methylcyclohexanecarboxylate, bis(3,4-epoxycyclohexylmethyl) adipate and bis(3,4-epoxy-6-methylcyclohexylmethyl) adipate.

Preferred cycloaliphatic epoxy resins are bis(4-hydroxycyclohexyl)methanediglycidyl ether, 2,2-bis(4-hydroxycyclohexyl)propanediglycidyl ether, tetrahydrophthalic acid diglycidyl ester, 4-methyltetrahydrophthalic acid diglycidyl ester, 4-methylhexahydrophthalic acid diglycidyl ester, 3,4-epoxycyclohexylmethyl 3',4'-epoxycyclohexanecarboxylate and especially hexahydrophthalic acid diglycidyl ester.

The cycloaliphatic epoxy resins can also be used in combination with aliphatic epoxy resins. As "aliphatic epoxy resins" it is possible to use epoxidation products of unsaturated fatty acid esters. It is preferable to use epoxy-containing compounds derived from mono- and poly-fatty acids having from 12 to 22 carbon atoms and an iodine number of from 30 to 400, for example lauroleic acid, myristoleic acid, palmitoleic acid, oleic acid, gadoleic acid, erucic acid, ricinoleic acid, linoleic acid, linolenic acid, elaidic acid, licanic acid, arachidonic acid and clupanodonic acid.

For example, there are suitable the epoxidation products of soybean oil, linseed oil, perilla oil, tung oil, oiticica oil, safflower oil, poppyseed oil, hemp oil, cottonseed oil, sunflower oil, rapeseed oil, polyunsaturated triglycerides, triglycerides from euphorbia plants, groundnut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, tall oil and derivatives thereof.

Also suitable are higher unsaturated derivatives that can be obtained by subsequent dehydrogenation reactions of those oils.

The olefinic double bonds of the unsaturated fatty acid radicals of the above-mentioned compounds can be epoxidised in accordance with known methods, for example by reaction with hydrogen peroxide, optionally in the presence of a catalyst, an alkyl hydroperoxide or a peracid, for example performic acid or peracetic acid. Within the scope of the invention, both the fully epoxidised oils and the partially epoxidised derivatives that still contain free double bonds can be used for component (a).

Preference is given to the use of epoxidised soybean oil and epoxidised linseed oil.

When cycloaliphatic epoxy resins are used in combination with aliphatic epoxy resins, the advantageous ratio by weight of cycloaliphatic to aliphatic component is from 1:0 to 0.6:0.4.

The cycloaliphatic epoxy resins used according to the invention comprise so-called core/shell polymers in suspended form as tougheners, the tougheners being liquid or solid in the starting state. They should not contain reactive groups that could react with the epoxy groups of the epoxy resin in question. It is preferable to use solid tougheners. They have the advantage that the particle size and also the proportion of toughening phase in the suspension are preset, whereas in the case of liquid tougheners the required second phase is formed during the curing with the epoxy resin.

Core/shell polymers generally have a soft core of an elastomeric material that is insoluble in the epoxy resin. Grafted onto that core is a shell of polymeric material that does not contain any groups capable of reacting with the epoxy resin.

Examples of elastomers that can be used as core material are polybutadiene, polyacrylic acid esters and polymethacrylic acid esters and co- or ter-polymers thereof with polystyrene, polyacrylonitrile or polysulfide.

Examples of polymeric shell materials are polystyrene, polyacrylonitrile, polyacrylate and methacrylate homo-, di- or ter-polymers and styrene/acrylonitrile/glycidyl methacrylate terpolymers.

Preference is given to suspensions comprising a solid core/shell polymer.

The size of such core/shell particles is advantageously from 0.05 to 30 $\mu$m, preferably from 0.05 to 15 $\mu$m. Core/shell particles less than 1 $\mu$m in size are especially used.

The core/shell polymers can be produced, for example, in the manner described in U.S. Pat. No. 4,419,496 or EP-A 0 045 357.

Especially preferred is the use of core/shell polymers that contain a core of polybutadiene or polybutadiene/polystyrene. Such a core material is preferably only partially crosslinked. Further core materials are polyacrylates and polymethacrylates, especially polyacrylic acid esters and polymethacrylic acid esters and di- or ter-polymers thereof.

The shell consists especially of polymers based on methyl methacrylate, cyclohexyl methacrylate, butyl acrylate, styrene and methacrylonitrile, but especially based on polymethyl methacrylate.

The amount of toughener in the suspensions according to the invention that comprise a cycloaliphatic or aliphatic epoxy resin is preferably from 1 to 30% by weight, especially from 5 to 10% by weight, based on the epoxy resin.

For curing the compositions according to the invention, polycarboxylic anhydrides are used.

They may be linear aliphatic polymeric anhydrides, for example polysebacic polyanhydride or polyazelaic polyanhydride, or cyclic carboxylic anhydrides.

Cyclic carboxylic anhydrides are especially preferred.

Examples of cyclic carboxylic anhydrides are:

succinic anhydride, citraconic anhydride, itaconic anhydride, alkenyl-substituted succinic anhydrides, dodecenylsuccinic anhydride, maleic anhydride and tricarballylic anhydride, a maleic anhydride adduct with cyclopentadiene or methylcyclopentadiene, a linoleic acid adduct with maleic anhydride, alkylated endoalkylenetetrahydrophthalic anhydrides, methyltetrahydrophthalic anhydride and tetrahydrophthalic anhydride, the isomeric mixtures of the two latter compounds being especially suitable. Especially preferred are hexahydrophthalic anhydride and methylhexahydrophthalic anhydride.

The compositions according to the invention can optionally additionally comprise a curing accelerator. Suitable accelerators are known to the person skilled in the art. Examples that may be mentioned are:

complexes of amines, especially tertiary amines, with boron trichloride or boron trifluoride;

tertiary amines, such as benzyldimethylamine;

urea derivatives, such as N-4-chlorophenyl-N',N'-dimethylurea (monuron);

unsubstituted or substituted imidazoles, such as imidazole or 2-phenylimidazole.

Preferred accelerators are tertiary amines, especially benzyldimethylamine, and imidazoles (e.g. 1-methylimidazole) for the above-mentioned compositions that comprise epoxidised oils.

The curing agents and, where applicable, accelerators are used in the customary effective amounts, that is to say amounts sufficient for curing the compositions according to the invention. The ratio of the components resin system/hardener/accelerator depends upon the nature of the compounds used, the rate of curing required and the properties desired in the end product and can readily be determined by the person skilled in the art. Generally, from 0.4 to 1.6 equivalents, preferably from 0.8 to 1.2 equivalents, of anhydride groups per epoxy equivalent are used.

The curing accelerators are usually used in amounts of from 0.1 to 20 parts by weight per 100 parts by weight of epoxy resin.

As component c1 the compositions according to the invention comprise fillers having flame-retardant properties. Such fillers exhibit flame-retardant properties because their nature is such that, starting at room temperature, they are able to release water as the temperature rises. There are therefore suitable, for example, aluminium hydroxide, water-containing magnesia or zinc borate or other substances that decompose with the release of water at elevated temperatures.

It is preferable to use aluminium hydroxide, which may be either untreated or thermally pretreated and/or silanised Al(OH)$_3$. "Thermally pretreated" in this context means that, by means of heat treatment, water is removed from the aluminium hydroxide advantageously in an amount of from about 0.5 to about 10% by weight, based on the original weight before removal of the water. Methods in this connection are described in FR 2 630 578 B1.

In order to obtain the desired mechanical strength, the starting resin is actively reinforced by the addition of a further filler c2 which is different from c1. Examples of suitable reinforcing materials c2 are glass fibres or carbon fibres. The following materials, for example, also come into consideration as component c2: metal powder, wood flour, glass powder, glass beads, semi-metal and metal oxides, such as $SiO_2$ (quartz sand, quartz powder, silanised quartz powder, fused silica powder, silanised fused silica powder), aluminium oxide, titanium oxide and zirconium oxide, semi-metal and metal nitrides, for example silicon nitride, boron nitrides and aluminium nitride, semi-metal and metal carbides (SiC and boron carbides), metal carbonates (dolomite, chalk, $CaCO_3$), metal sulfates (barytes, gypsum), ground minerals, and natural or synthetic minerals chiefly of the silicate series, e.g. zeolites (especially molecular sieves), talcum, mica, kaolin, wollastonite, silanised wollastonite and others.

Preferred fillers c2 are quartz powder, silanised quartz powder, wollastonite and silanised wollastonite, both on their own and in combination.

Wollastonite is a naturally occurring acicular calcium silicate of the formula $Ca_3[Si_3O_9]$ having particle sizes in the micron range. Artificially produced wollastonite is also acicular. Wollastonite is commercially available, for example under the name Nyad® from the Nyco company.

The total proportion of components (c1) and (c2) in % by weight is from 58 to 73% by weight, preferably from 63 to 68% by weight, based on the total amount of components (a), (b), (C1) and (c2), and the ratio by weight of the fillers (C1):(c2) is from 1:3 to 1:1, preferably from 1:2.3 to 1:2.

If desired, in addition to fillers c1 and c2 it is also possible to use a wetting and dispersing agent, which reduces the mainly electrostatic interactive forces between resin and filler and the increased viscosity caused thereby.

The wetting and dispersing agent is advantageously used in an amount of about from 0.1 to 2.0% by weight, based on the total amount of components (a) and (b).

In addition to the fillers c1 and c2 mentioned above and, where applicable, a wetting and dispersing agent, the curable mixtures may comprise further customary additives, e.g. antioxidants, light stabilisers, fillers containing water of crystallisation, plasticisers, dyes, pigments, fungicides, thixotropic agents, antifoams, antistatics, lubricants, anti-settling agents, wetting agents and mould-release aids.

The compositions according to the invention can be produced in accordance with known methods using known mixing apparatus, for example stirrers, kneaders and rollers. The curing of the mixtures according to the invention can be carried out in known manner in one or more steps. It is generally effected by heating to temperatures of from 60° C. to 200° C., especially from 80° C. to 180° C. When curing is carried out in two or more steps, it means that curing is effected in stages, each at a higher temperature.

The invention accordingly relates also to crosslinked products obtainable by curing a composition according to the invention.

EXAMPLES

The preparation, composition and test results of four Reference Examples and three Invention Examples are given below. For the corresponding quantitative data see also Table 1. In each case a resin premix and a hardener premix are prepared. The two mixtures are then combined to form a total mixture, which is used in the casting, full curing and measurement of test specimens. The general steps in detail:

Resin Premix

For each resin premix, all the components are introduced into a mixing vessel and intimately mixed together for one hour at a pressure of 1 mbar and a temperature of 50° C.

Hardener Premix

Likewise, for each hardener premix, all the components are introduced into a mixing vessel and intimately mixed together for one hour at a pressure of 1 mbar and a temperature of 50° C.

Total Premix

For the preparation of each total mixture, the respective resin and hardener premixes are intimately mixed together for 20 min at a pressure of 1 mbar and a temperature of 50° C.

Curing/test Specimens

For the production of the test specimens, each total mixture is introduced into a metal mould that has been preheated to 100° C. and then fully cured, first for 2 hours at 100° C. and then for 10 hours at 140° C. Using the test specimens so produced, the measurement values given in Table 1 are obtained.

The resins and hardeners listed below, which are used for the Examples, all originate from Ciba Spezialitätenchemie:

Resins (Data: E=Epoxy Content in Equivalents/kg, V=Viscosity in mPa·s)

1=liquid cycloaliphatic epoxy resin based on hexahydrophthalic acid diglycidyl ester; E: 5.8–6.1; V: 700–1000

2=liquid mixture of 90% by weight bisphenol A epoxy resin and polyoxypropylene glycol diglycidyl ether; E: 4.9–5.4; V: 4200–5700

3=bisphenol A epoxy resin; E: 5.1–5.3; V: 8500–15 000

4=liquid cycloaliphatic epoxy resin as resin 1 but with 10% core/shell content based on methyl methacrylate and polybutadiene latex (1:1); E: 5.2–5.5; V: 3500–5000

Hardeners

1=hexahydrophthalic anhydride

2=amine-accelerated hardener formulation based on (methylhexahydrophthalic anhydride/hexahydrophthalic anhydride/methyltetrahydrophthalic anhydride=70:15:15 pbw), containing 38% by weight of a semiester of succinic acid and polyethylene glycol (400 g/mol)

3=accelerated formulation of methyltetrahydrophthalic anhydride and 50% by weight semiester of tetrahydrophthalic acid and polypropylene glycol (400 g/mol), with an anhydride equivalent of from 2.6 to 3 eq./kg;

4=mixture of hexahydrophthalic anhydride and methylhexahydrophthalic anhydride (70/30 ppw)

| Other components used: | |
|---|---|
| antifoam: | "BYK ® A 501" (Byk Chemie) |
| dispersant: | "BYK ® W 9010" (Byk Chemie) |
| silicic acid: | "R 202" (Degussa) |
| accelerator 1: | N,N-dimethylbenzylamine |
| accelerator 2: | 10% methylimidazole, 3.3% NaOCH$_3$, 7.7% CH$_3$OH, balance: PPG 400 |
| quartz powder: | "W 12" (Quarzwerke Frechen) |
| wollastonite: | untreated, natural wollastonite, K = average particle size (D$_{50}$ value) in $\mu$: 13–20; specific surface area (BET): 1–1.4 m$^2$/g |
| anti-settling agent: | "EXL 2300" (Rohm & Haas) | aluminium hydroxides (ATH=aluminium trihydroxide):
Data: K=average particle size (D$_{50}$ value) in $\mu$, G=loss on ignition in %

| | | |
|---|---|---|
| ATH1: | heat-treated, silanised; | K: 14–18, G: 31.0 +/– 1 |
| ATH2: | untreated, "Apyral 2E" (Nabaltec); | K: 15–27; G: 34.5 +/– 1 |
| ATH4: | untreated, "Apyral 4" (Nabaltec); | K: 9–13; G: 34.5 +/– 1 |

A) REFERENCE EXAMPLES (NOT ACCORDING TO THE INVENTION)

A1) Example of a Non-flame-retarded Cycloaliphatic System a) Resin premix (1 filler)
   100 g resin 1; 150 g quartz powder.
b) Hardener premix (1 filler)
   90 g hardener 1; 150 g quartz powder, 3 g accelerator 2.
c) Total mixture (total filler content 61%)
   250 g resin premix; 243 g hardener premix.

A2) Example of a Typical Flame-retarded System a) Resin premix (2 fillers in a ratio of 1:4)
   100 g resin 2; 39 g quartz powder; 156 g ATH2.
b) Hardener premix (2 fillers in a ratio of 1:4)
   100 g hardener 2; 39 g quartz powder; 156 g ATH2.
c) Total mixture (total filler content 66%)
   295 g resin premix; 295 g hardener premix.

A3) Experiment for a Flame-retarded Cycloaliphatic System Having Good Dielectric Properties by the Addition of Aluminium Hydroxide to System A1 a) Resin premix (2 fillers in a ratio of 1:4)
   100 g resin 1; 30 g quartz powder; 120 g ATH2.
b) Hardener premix (2 fillers in a ratio of 1:4)
   90 g hardener 1; 30 g quartz powder; 120 g ATH2, 3 g accelerator 2.
c) Total mixture (total filler content 61%)
   250 g resin premix; 243 g hardener premix.

A4) Formulation According to FR 2 630 578 B1 a) Resin premix (2 fillers in a ratio of 1:3)
   200 g resin 3; 75 g quartz powder; 225 g ATH1.
b) Hardener premix (2 fillers in a ratio of 1:3)
   200 g hardener 3; 75 g quartz powder; 225 g ATH1.
c) Total mixture (total filler content 60%)
   500 g resin premix; 500 g hardener premix.

B) INVENTION EXAMPLES

B1)

a) Resin premix (2 fillers in a ratio of 2.33:1)
   175.8 g resin 4; 261.5 g quartz powder; 112.1 g ATH1.
b) Hardener premix (2 fillers in a ratio of 2.33:1)
   140.9 g hardener 4; 2.55 g dispersant; 0.72 g accelerator 1; 214.5 g quartz powder; 91.9 g ATH1.
c) Total mixture (total filler content 68%)
   549.4 g resin premix; 450.6 g hardener premix.

B2)

a) Resin premix (2 fillers in a ratio of 1.86:1)
   400.9 g resin 4; 1 g antifoam; 1 g silicic acid; 388.1 g wollastonite; 209 g ATH1.
b) Hardener premix (2 fillers in a ratio of 1.86:1)
   320.6 g hardener 4; 5 g dispersant; 1.4 g accelerator 1; 8 g EXL 2300;
   2 g silicic acid; 432.9 g wollastonite; 232 g ATH1.
c) Total mixture (total filler content 63%)
   1000 g resin premix, 1001.9 g hardener premix.

B3) As B1 but Using ATH4 Instead of ATH1 a) Resin premix (2 fillers in a ratio of 2.33:1)
   175.8 g resin 4; 261.5 g quartz powder; 112.1 g ATH4.
b) Hardener premix (2 fillers in a ratio of 2.33:1)
   140.9 g hardener 4; 2.55 g dispersant; 0.72 g accelerator 1; 214.5 g quartz powder; 91.9 g ATH4.
c) Total mixture (total filler content 68%)
   549.4 g resin premix; 450.6 g hardener premix.

TABLE 1

| | Reference/Invention Examples | | | | | | |
|---|---|---|---|---|---|---|---|
| | RE1 | RE2 | RE3 | RE4 | IE1 | IE2 | IE3 |
| resin | 1 | 2 | 1 | 3 | 4 | 4 | 4 |
| cycloaliphatic | yes | no | yes | no | yes | yes | yes |
| [g] | 100 | 100 | 100 | 200 | 175.8 | 400.9 | 175.8 |
| core/shell in resin | no | no | no | no | yes | yes | yes |
| hardener | 1 | 2 | 1 | 3 | 4 | 4 | 4 |
| [g] | 90 | 100 | 90 | 200 | 140.9 | 320.6 | 140.9 |
| fillers [g] | | | | | | | |
| quartz (Q) or wollastonite (W) | Q 300 | Q 78 | Q 60 | Q 150 | Q 476 | W 821 | Q 476 |
| ATH1 | — | — | — | 450 | 204 | 441 | — |
| ATH2 | — | 312 | 240 | — | — | — | — |
| ATH4 | — | — | — | — | — | — | 204 |
| content of ATH in filler [%] | 0 | 80 | 80 | 75 | 30 | 35 | 30 |
| total filler content [%] | 61.0 | 66.0 | 61.0 | 60.0 | 68.0 | 63.0 | 68.0 |
| Measurement values | | | | | | | |
| Tg (DSC) [° C.][1) | 105 | 60 | 112 | 63 | 102 | 102 | 107 |
| elongation (tensile test) [%][2) | 1.8 | 0.65 | 0.74 | 1.1 | 0.77 | 0.8 | 0.81 |
| G$_{IC}$ [J/m$^2$][3) | 525 | 405 | 402 | 542 | 432 | 648 | 490 |
| CTE [10$^{-6}$/K][4) | 40 | 40 | 38.4 | 41 | 36.9 | 33.9 | 33.8 |
| temperature for tan $\delta$ = 25% [° C.][5) | 155 | 105 (10%) | 135 | ~100 | 167 | 163 | 175 |
| LOI (oxygen index) | 25 | 40 | 37.9 | 29.9 | 30.4 | 30.1 | 31.3 |

TABLE 1-continued

| | Reference/Invention Examples | | | | | | |
|---|---|---|---|---|---|---|---|
| | RE1 | RE2 | RE3 | RE4 | IE1 | IE2 | IE3 |
| [%][5] crack index[7] | −43 | −7 | +5 | −37 | −26 | −50 | −34 |

Note:
[1]DSC (Differential Scanning Calorimetry) carried out using TA 4000 apparatus (Mettler)
[2]according to ISO R527
[3]breaking energy $G_{1C}$: double torsion test
[4]CTE = Coefficient of Thermal Expansion measured according to DIN 53752
[5]electrical values (tan δ) according to DIN 53483, measurement frequency 50 Hz
[6]LOI according to ASTM D2863
[7]see explanation in text Reference Example 1 is a non-flame-retarded cycloaliphatic system. Reference Example 2 is a typical flame-retarded system. Reference Example 3 is the experiment to obtain a flame-retarded cycloaliphatic system having good dielectric properties by the addition of aluminium hydroxide to the system of Reference Example 1. Finally, Reference Example 4 is a formulation according to FR 2 630 578 B1.

The crack index given in Table 1 represents a number of mechanical values, all of which are able to influence the cracking behaviour in the event of stress caused by changes in temperature, combined to form a single variable, the so-called crack index. The crack index enables an objective comparison of the mechanical qualities of different systems to be made more easily.

The following qualitative statements, relating to the effects of changes in individual parameters on the temperature variation behaviour, can be derived empirically:

1. The higher the $T_G$ value, the poorer is the temperature variation behaviour.
2. The lower the $G_{1C}$ value, the poorer is the temperature variation behaviour.
3. The lower the elongation value, the poorer is the temperature variation behaviour.
4. The higher the expansion coefficient (CTE), the poorer is the temperature variation behaviour.

However, when several parameters are changed simultaneously it is no longer possible to make qualitative statements about the resulting temperature variation behaviour. When, for example, both the $T_G$ value and the $G_{1C}$ value rise but the CTE value decreases, it is no longer possible to make predictions as to the temperature variation behaviour that is to be expected.

At Ciba Spezialitätenchemie, statistical evaluations of measurement values using a large number of extremely varied systems have led to a formula for calculating a new variable, the so-called crack index, which formula is extremely helpful from the standpoint of application technology. Using this variable it is now possible, even in the event of multiple changes, to make statements relating to the resultant temperature variation behaviour to be expected.

The formula is as follows:

$$RI = -498.08 \cdot Z^{0.18480890} \cdot G^{0.194114601} \cdot (A-18)^{-0.391334273} \cdot T^{-0.158387791} + 224.25$$

where: RI=crack index; Z=tensile elongation in %; G=$G_{1C}$ in J/m$^2$;
A=expansion coefficient in ppm/K and T=$T_G$ in °C.

Using that formula, a decrease in the crack index value indicates an improvement in the resistance to temperature variation that is to be expected. The crack index correlates very well with the average cracking temperature in °C., which can be determined in a practical cracking test. That cracking temperature and thus also the crack index provide an indication of the temperature beyond which cracks are likely to form (caused by stress in the event of temperature fluctuations and differences in the expansion coefficients of potting compound and metal insert). Air-cooled transformers subjected to a temperature change test according to Cenelec standard HD 464 (which begins at −25° C. for class "C2") have a good chance of withstanding the test when the potting system used has a crack index below −25 (the value critical for this invention). The lower the crack index, the less susceptible is the system in practice in respect of stress.

Table 1 also shows the measured LOI values (according to ASTM D2863). The higher the LOI value, the better is the flame retardance. For a usable system that can be said to be sufficiently flame-retardant, the measured LOI value should be >30.

Finally, Table 1 gives the measured temperatures at which the dielectric loss factor tan δ has a certain value (here 25%). The higher the temperature at which the tan δ has that value, the better is the dielectric behaviour of the material at elevated temperature. The aim of the present invention was, in view of the intended applications, to obtain values of appreciably >150° C.

The compositions according to the invention are distinguished by the fact that they exhibit simultaneously the features of good flame retardance, high mechanical strength and low dielectric losses at high operating temperatures.

They are therefore particularly suitable as casting resins especially for applications in the electronics industry, for example in the impregnation of electrical coils and in the production of air-cooled transformers, bushings, insulators, switches, sensors, converters and cable end seals.

The invention relates also to the use of the compositions according to the invention as electrical insulation material.

What is claimed is:

1. A curable composition comprising:
   (a) a cycloaliphatic epoxy resin that is liquid at room temperature and, suspended therein, a core/shell polymer;
   (b) a polycarboxylic anhydride; and
   (c) two different fillers, (c1) and (c2),
   wherein (c1) is a filler that is able to release water as the temperature rises above room temperature; (c2) is a reinforcing material; the total proportion of fillers (c1) and (c2) is from 58 to 73% by weight based on the total amount of components (a), (b), (c1) and (c2) in the composition; and the ratio by weight of the fillers (c1):(c2) is in the range from 1:3 to 1:1.

2. A curable composition according to claim 1, wherein the total proportion of fillers (c1) and (c2) is from 62 to 68% by weight.

3. A curable composition according to claim 2, wherein the ratio by weight of the fillers (c1):(c2) is in the range from 1:2.3 to 1:2.

4. A curable composition according to claim 2, wherein the ratio by weight of the fillers (c1):(c2) is 1:1.86.

5. A curable composition according to claim 2, wherein the ratio by weight of the fillers (c1):(c2) is 1:2.33.

6. A curable composition according to claim 1, wherein the cycloaliphatic epoxy resin is selected from the group consisting of
   bis(4-hydroxycyclohexyl)methanediglycidyl ether, 2,2-bis(4-hydroxycyclehexyl)propanediglycidyl ether, tetrahydrophthalic acid diglycidyl ester, 4-methyltetrahydrophthalic acid diglycidyl ester, 4-methylhexahydrophthalic acid diglycidyl ester, and 3,4-epoxycyclohexylmethyl 3',4'-epoxycyclohexanecarboxylate.

7. A curable composition according to claim 1, wherein the cycloaliphatic epoxy resin is hexahydrophthalic acid diglycidyl ester.

8. A curable composition according to claim 1, wherein the core/shell polymer is a solid core/shell polymer.

9. A curable composition according to claim 1, wherein the amount of core/shell polymer suspended in the epoxy resin is from 1 to 30% by weight based on the epoxy resin.

10. A curable composition according to claim 9, wherein the amount of core/shell polymer suspended in the epoxy resin is from 5 to 10% by weight based on the epoxy resin.

11. A curable composition according to claim 1, wherein the core/shell polymer is methylmethacrylate and polybutadiene latex in a 1:1 ratio.

12. A curable composition according to claim 1, wherein filler (c2) is selected from the group consisting of quartz powder, silanised quartz powder, wollastonite, silanised wollastonite, and combinations thereof.

13. A curable composition according to claim 1, wherein filler (c1) is selected from the group consisting of untreated or thermally pretreated aluminum hydroxide, and silanised versions of the foregoing.

14. A crosslinked product obtained by curing a composition according to claim 1.

15. An improved method for the impregnation of electrical coils with a curable casting resin, wherein the improvement comprises the use of a curable composition according to claim 1 as the casting resin.

16. An improved method for the production of an electrical component utilizing a curable casting resin, wherein the improvement comprises the use of a curable composition according to claim 1 as the casting resin.

17. The improved method of claim 16, wherein the electrical component is selected from the group consisting of air-cooled transformers, bushings, insulators, switches, sensors, converters, and cable end seals.

* * * * *